Sept. 19, 1939.   A. L. FREEDLANDER   2,173,359
HOSE
Filed Dec. 10, 1936
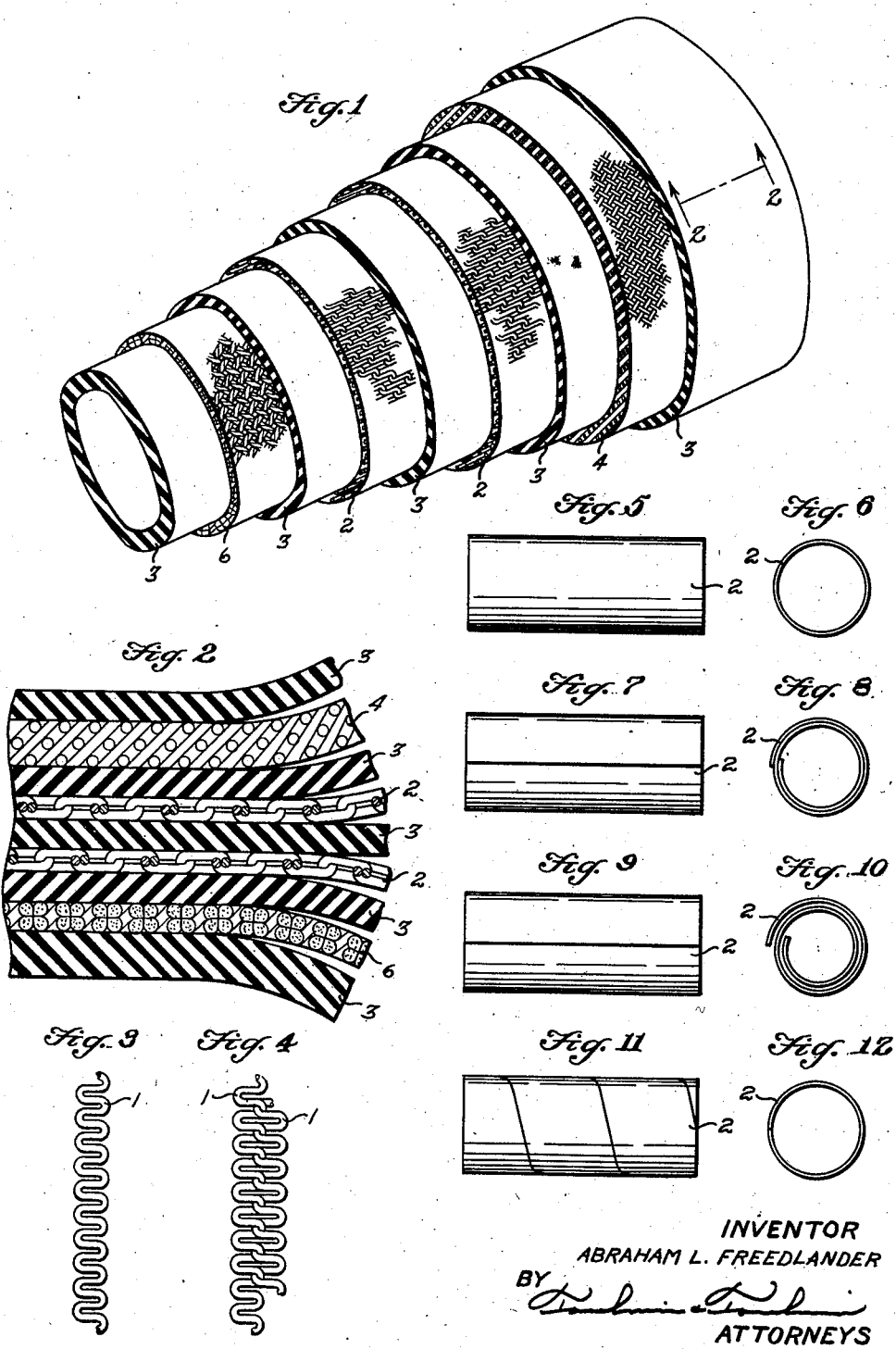
INVENTOR
ABRAHAM L. FREEDLANDER
BY
ATTORNEYS Patented Sept. 19, 1939

2,173,359

UNITED STATES PATENT OFFICE 2,173,359

HOSE

Abraham L. Freedlander, Dayton, Ohio, assignor to The Dayton Rubber Manufacturing Company, Dayton, Ohio, a corporation of Ohio Application December 10, 1936, Serial No. 115,197

3 Claims. (Cl. 138—56)

This invention relates to hose and particularly to hose reinforced against damage by tension, bending, suction or pressure, and abrasion of the exterior.

It is an object of this invention to provide a hose consisting of rubber reinforced by means including longitudinally inextensible flexible metal mesh.

It is a further object of this invention to provide such a reinforcement which is longitudinally inextensible and which will protect the hose against damage due to tension without reducing the flexibility thereof.

It is a further object of this invention to provide such a reinforcement which will protect the hose against damage due to bending without materially increasing the weight thereof or decreasing the flexibility thereof.

It is a further object of this invention to provide, in reinforced rubber hose, a greater amount of flexibility in the hose than may be otherwise achieved for a given amount of rubber.

It is a further object of this invention to provide flexible longitudinally inextensible reinforcing means which is imbedded in the body of the hose whereby to secure strength against suction, pressure, bending, and tension, without obstruction of the bore of the hose.

It is a further object of this invention to provide, in a hose construction, a reinforcement comprising articulated metallic mesh provided with apertures or interstices adapted, when the mesh is imbedded in rubber, to contain sufficient rubber to resiliently connect the portions of the rubber body at opposite sides of the mesh whereby to substantially strengthen the rubber without impairment of the resiliency thereof.

It is a further object of this invention to provide, as a reinforcement for rubber, a metal mesh which is stronger than fabric and which possesses substantially the same flexing characteristics as does rubber.

In the construction of reinforced rubber hose, it has formerly been proposed to strengthen the rubber of the hose against excessive tension, against excessive injurious bending and/or kinking and against the application of suction or pressure to the interior thereof by incorporation in the body of the hose helically wound wire, either flat or semicircular, or by applying such reinforcements to the inner wall of the hose, in which latter case the smoothness of the bore of the hose was substantially destroyed. When such helical members are used the friction of fluid transmission is materially increased, which substantially limits the use of such hose. Further, it was found that the application of excessive tension caused damaging, friction or cutting action between the metallic reinforcing members and the adjacent rubber.

Aside from these defects, the strength of the hose was by no means uniform from end to end as is the case with hose constructed according to the principles of this invention. Furthermore, the weight of the hose was substantially increased by the use of prior known reinforcements and the cost thereof was extremely high.

According to the principles of this invention, I propose to provide, in rubber hose, means for substantially strengthening one or more of the rubber layers thereof by the use of inextensible, flexible, woven mesh, the use of which, due to the extension through the interstices thereof of the rubber from opposite sides, does not impair the initial resiliency of the rubber.

By the use of the term "rubber", it is, of course, to be understood that I comprehend synthetic rubber and other rubber equivalents.

The reinforcing of resilient bodies of rubber and/or synthetic rubber was heretofore sought to be accomplished by the incorporation therein of somewhat flexible reinforcing members of fabric, metal and other materials having continuous surfaces unprovided with interstices or apertures capable of permitting the extension therethrough of sufficient rubber resiliently to connect together the portions of the resilient body at opposite sides of the reinforcement; the resiliency of the body was, therefore, substantially impaired by the incorporation therein of the reinforcement.

While, in some cases, the reinforcing material was possessed of sufficient flexibility for the purpose, it so effectively separated or insulated the portions of the resilient body as to impart to the body the properties of two separate resilient bodies rigidly connected together or each connected to the opposite side of a member through which the resilient waves from one body could not pass to the other body.

Where the bond between the portions of the resilient body and the connecting reinforcing material was imperfect, destruction of the bond speedily followed application of force to the body, either in tension or compression, especially when the force was applied intermittently over a period of time. This objectionable condition was most often encountered in the reinforcement of synthetic rubber and other similar vulcanizable compositions due to the difficulty of securing perfect bonding thereof to reinforcing materials in general and in particular to metallic reinforcing materials.

By reinforcing such resilient bodies by the incorporation therein of flexible mesh provided with interstices or apertures capable of permitting the extension therethrough of sufficient resilient body material from one side of the mesh to the other side thereof, I have totally avoided the above objectionable conditions. I achieve satisfactory reinforcement of the resilient body material without impairment of the resiliency thereof, even where the bond between the resilient body material and the reinforcement is not perfect. Due to the extension of the resilient body material through the interstices of the flexible mesh, the resiliency of the reinforced resilient material is unimpaired because, due to its flexibility, the mesh acts with, instead of against, the resiliency of the material. Likewise, the longitudinal inextensibility of the flexible mesh imparts additional strength in tension when the longitudinal axis thereof is disposed parallel to that of the hose, and this increase of strength and tension occurs without, in any way, impairing the flexibility of the hose.

Furthermore, in some instances, it is desired, in order to avoid danger from static electricity, to provide electrical connection between the metallic settings at opposite ends of the hose, as is the case, for instance, with gasoline hose. By providing a layer of metallic mesh at or adjacent the surface of the hose, according to the principles of my invention, it is possible to secure electrical connection between one end of the mesh and one end fitting, and between the other end portion of the mesh and the fitting at the opposite end of the hose. This eliminates the necessity for use of a separate electrical connection between the fittings, such as a separate copper or other electrical conducting wire connected between the metallic parts.

These and other objects and advantages will appear from the following description taken in connection with the drawing.

In the drawing:

Figure 1 is a view, illustrative of the application of the principles of this invention to a hose construction having substantial thickness and comprising nine main sections including a heat insulating section;

Figure 2 is a section taken on the line 2—2 of Figure 1;

Figure 3 is a view showing a single sinuous metallic strand of a preferred form of metal mesh which is adapted to be disposed transversely of the longitudinal axis of the mesh;

Figure 4 is a view showing the interconnection between adjacent transverse sinuous strands of the mesh;

Figure 5 is a diagrammatic elevational view of a length of cylindrical flexible mesh reinforcing material;

Figure 6 is an end view of the structure shown in Figure 5;

Figure 7 is a view similar to Figure 5, but illustrative of the formation of a tube of mesh formed from a strip thereof;

Figure 8 is an end view of the structure shown in Figure 7;

Figure 9 is a view similar to Figure 7, illustrative of the formation of a tube of mesh comprising a plurality of spaced layers formed by spirally winding a strip;

Figure 10 is an end view of the structure shown in Figure 9;

Figure 11 is a view similar to Figure 9, but illustrating the formation of a tube of flexible mesh by spirally winding a strip thereof; and Figure 12 is an end view of the structure illustrated in Figure 11.

Referring to the drawing in detail, and with reference particularly to Figures 1 to 12 inclusive, it will be seen that the metal mesh is composed of transverse sinuous strands 1 of metal or metal wire, which are engaged as illustrated in Figure 4. The engaging bent portions in the respective strands 1 are arcuate throughout the contacting portions, whereby the mesh is provided with flexibility in the plane of the mesh and also about transverse axes which extend parallel to the length of the strands 1.

The adjacent strands 1 are likewise capable of movement toward one another, as seen in Figure 4, while the elongation of the mesh under tension is limited by the engagement of the respective adjacent and interconnected strands, as illustrated in Figure 4. The mesh is, therefore, flexible in the plane thereof, when flat, flexible about axes parallel to the strands 1, though longitudinally inextensible. The mesh is furthermore capable of substantial torsional flexibility about axes extending substantially longitudinally thereof. Due to the flexibility of the mesh, it is exceptionally suitable for use in the reinforcement of rubber and equivalent material, where it is desired to retain the natural resiliency of the material reinforced. Figures 3 and 4 show the strands of the mesh in plan. Figure 1 shows the mesh substantially in plan and substantially in end elevation. Figure 2 shows the mesh in side elevation.

As shown in Figures 1, 2, 5 and 6, the mesh may be formed into a seamless tube in which the longitudinal axis of the mesh extends longitudinally of the tube. The tube so formed is longitudinally inextensible, though possessed of substantial flexibility in bending due to the ability of the adjacent strands 1 to telescope or move toward one another, as illustrated in Figure 4. The tube is inextensible beyond a predetermined point because the extension thereof is limited by the engagement of the respective adjacent strands, as illustrated in Figure 4. Due to the fact that the adjacent strands at one side of the tube may move telescopically toward one another while the opposite portion of the tube is in tension, the tube is freely bendable or flexible.

As illustrated in Figure 7, a tube of a plurality of layers may be formed from a strip of the mesh and the strands of the mesh may, as is also the case with the endless tube shown in Figures 5 and 6 and also with that shown in Figures 9 and 10, extend annularly with respect to the tube or may extend longitudinally with respect thereto. With the latter disposition of the strands longitudinally, rigidity of the tube is increased while flexibility thereof with respect to forces applied radially with respect to the axis thereof is decreased. In the form illustrated in Figures 7 and 8, the respective layers of the mesh are substantially in direct contact.

Where it is desired, the respective layers of the spirally wound tube, as illustrated in Figures 9 and 10, may be substantially separated one from the other in order that a substantially continuous spiral zone of rubber or similar material may be interposed between the respective layers. The tube may be formed as illustrated in Figures 11 and 12, where it is desired that substantial rigidity against longitudinal force be provided in the reinforcing tube. Whether the strands 1 of the strip used to form the tube illustrated in Figures 11 and 12 be disposed transversely or longitudinally with respect to the longitudinal axis of the strip, they will be disposed angularly with respect to the axis of the reinforcing tube so formed. This latter construction is particularly suitable for use in the reinforcement of hose or tubes against the force of intermittent pulsations as well as against continuous pressure or continuous suction.

While the principles of my invention may be applied to the reinforcement of hose comprising a single layer of rubber or other equivalent vulcanizable material, the application of these principles may be made in the reinforcement of rubber tubes or layers of composite hose or tubing. In the respective figures, the flexible metal mesh is designated 2, being comprised of a great number of strands 1, as described above. The mesh 2 is in tubular or substantially tubular form and may be disposed as illustrated in Figures 5 and 6, as illustrated in Figures 7 and 8, or as illustrated in Figures 11 and 24, depending upon the bendability desired in the hose and the purpose for which it is intended.

In the illustrations, the reference numeral 3 will be used to designate an annular or cylindrical section of rubber; the reference numeral 4 will be used to designate an annular or cylindrical section of rubber impregnated fabric, and the reference numeral 5 will be used to designate a layer of rubber or rubber equivalent reinforced with flexible metal mesh. It is to be understood that, where the hose illustrated in the figures is to be used for the transmission of fluids which readily attack and destroy rubber, substances and compositions such as synthetic rubber or Glyptal resins, which are resins of Alkyd type and particularly of the glycerol phthalate type, may be used instead of rubber. The term "Glyptals" is commonly used in the art to denote resins of this latter class. Other vulcanizable resilient materials may likewise be substituted for rubber in any of the constructions hereinafter described.

Likewise, where resistance to the attack of acids and other harmful substances is required, the cover section of the hose may be formed of rubber substitute compositions, particularly adapted for resistance to these substances.

The axes of the respective tubular mesh reinforcing sections 2 may be either parallel or disposed at an angle to one another and the reinforcement may take the form of a plurality of concentrically disposed endless tubes, as illustrated in Figures 5 and 6, or may be formed as illustrated in Figures 7 and 8 or Figures 9 and 10 or, if desired, one of the layers may be formed as illustrated in Figures 11 and 12, while the other is formed as illustrated in Figures 5 and 6, and the respective layers may be disposed concentrically one within the other.

In the hose construction illustrated in Figures 1 and 2, which is particularly adaptable for transmission of steam at high pressure, the liner or lining section is preferably formed of a rubber substitute in the form of a composition highly resistant to steam, and immediately adjacent and surrounding the liner or lining section 3 is a heat insulating section 6 of woven or braided asbestos fiber or the like, which insulating section is surrounded by a section of rubber 3 which, in turn, is surrounded by a plurality (a pair is illustrated) of tubular sections of metal mesh 2, separated from one another by a section or sections of rubber or rubber substitute 3. The outer section of flexible metal mesh 2 is surrounded by a section of rubber or rubber substitute 3 which, in turn, is surrounded by a fabricated reinforcing section of rubber impregnated fabric or other textile material 4, around which and to which is applied the hose cover of rubber or rubber substitute 3.

As pointed out above, the respective sections of the hose are vulcanized to form an integral tubular body having a bore which is tubular and smooth, and unobstructed by the projection of reinforcing members thereinto. Due to the projection of a portion of the resilient material from opposite sides of the flexible metal mesh, the resiliency of the rubber or rubber substitute is unimpaired by the incorporation therein of the flexible metal mesh. The mesh, as pointed out above, substantially strengthens the resilient material in the hose and imparts thereto a strength which is uniform throughout the length of the hose or tubing. Where it is desired thus to strengthen tubing of rubber or tubing having substantial rubber content, the flexible metal mesh may be incorporated therein, as pointed out above and as illustrated in the drawing, whereby to strengthen the hose or tubing without impairment of the resiliency and flexibility thereof.

Furthermore, due to the fact that the respective strands 1 of the mesh 2 have their movement with respect one to the other definitely limited in the direction of their length, the incorporation of such metal mesh in tubing formed entirely or partially of rubber utterly prevents kinking thereof and damage thereto.

By the use of the term "mesh", I comprehend any associated metallic reinforcements such as wires and foraminous plates and materials other than metal having these properties.

It will, of course, be understood that the above description is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. As a new article of manufacture for use as a hose in transmitting steam under pressure, a construction including a tubular section of vulcanizable steam resistant composition, a section of heat insulating material surrounding said first-named section, a plurality of concentrically and alternately arranged sections of rubber and flexible metal mesh disposed about said section of insulating material, a reinforcing section of rubber impregnated textile material surrounding said concentrically arranged sections, and a rubber cover section surrounding said last-named section, said sections being vulcanized into an integral tubular member.

2. A hose construction comprising a plurality of concentrically arranged tubular sections vulcanized together into an integral body, the exterior section being formed of rubber, the section adjacent thereto being formed of fabric impregnated with rubber, the central section being formed of rubber having imbedded therein a plurality of layers of flexible metal mesh provided with apertures containing sufficient rubber to resiliently connect the portions of said section at opposite sides of said mesh; and the hose lining section comprising resilient heat resistant material surrounded by a layer of heat insulating fiber.

3. A hose construction comprising a plurality of concentrically arranged tubular sections vulcanized together into an integral body, one of said sections being formed of resilient synthetic resin material, another of said sections comprising fabric impregnated with rubber and another of said sections being formed of rubber having embedded therein flexible metal mesh, said mesh being longitudinally inextensible and having articulated segments provided with apertures filled with rubber to resiliently connect the portions of said section at opposite sides of the mesh, said hose having a heat resistant inner lining and a heat insulating layer adjacent thereto.

ABRAHAM L. FREEDLANDER.